(12) United States Patent
Ellis

(10) Patent No.: US 8,933,798 B2
(45) Date of Patent: Jan. 13, 2015

(54) SYSTEM AND METHOD FOR CALCULATION AND DISPLAY OF PERFORMANCE DRIVING INFORMATION

(71) Applicant: Honda Motor Co., Ltd, Minato-ku, Tokyo (JP)

(72) Inventor: Nathaniel C. Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/775,782

(22) Filed: Feb. 25, 2013

(65) Prior Publication Data

US 2014/0240116 A1 Aug. 28, 2014

(51) Int. Cl.
*B60Q 1/00* (2006.01)

(52) U.S. Cl.
CPC .......................................... *B60Q 1/00* (2013.01)
USPC ...... 340/439; 340/539.13; 340/584; 340/905; 340/995.17; 345/632; 345/501

(58) Field of Classification Search
CPC ............................ G01C 21/3676; B60K 35/00
USPC ............ 340/439, 539.13, 584.1, 905, 995.17; 345/362, 501
See application file for complete search history.

(56) References Cited

U.S. PATENT DOCUMENTS

| | | | |
|---|---|---|---|
| 5,325,340 A | 6/1994 | Ramsey | |
| 5,696,706 A * | 12/1997 | Morton et al. | ............... 702/142 |
| 6,012,002 A | 1/2000 | Tapping et al. | |
| 2005/0251307 A1 | 11/2005 | Graf et al. | |
| 2006/0250273 A1 * | 11/2006 | Milner et al. | ............. 340/854.1 |
| 2011/0275940 A1 | 11/2011 | Nims et al. | |
| 2012/0306896 A1 * | 12/2012 | Krauss et al. | ................ 345/501 |

OTHER PUBLICATIONS

Race Technology Limited; DASH4PRO Instruction Manual; dated 2011, version 1.0; 51 pages in its entirety.
Race Technology Limited; DASH4 PRO Information at a glance with steering wheel mount data displays; http://www.race-technology.com/content.php?pcat=8&cat=31027; dated 2013.
PerformanceBox as a Lap Timer and Predictive Lap Timer; http://www.performancebox.co.uk/lap.html#predictive-lap, available at least as of Aug. 1, 2012.

* cited by examiner

*Primary Examiner* — Tai T Nguyen
(74) *Attorney, Agent, or Firm* — Ulmer & Berne LLP

(57) ABSTRACT

An electronic display comprises a graphical lap information display portion that comprises a lap time differential indicator and an illuminated portion. The lap time differential indicator is configured to display a differential time value. The illuminated portion is configured to selectively illuminate a portion of the graphical lap information display portion in a plurality of different lighting modes. The illuminated portion is operable in the plurality of different lighting modes in response to a rate of change of the differential time value. A vehicle and method are also provided.

11 Claims, 2 Drawing Sheets

SYSTEM AND METHOD FOR CALCULATION AND DISPLAY OF PERFORMANCE DRIVING INFORMATION

TECHNICAL FIELD

A vehicle includes an electronic display having a graphical lap information display portion for displaying lap data to a passenger of the vehicle.

BACKGROUND

Some conventional vehicles include an instrument cluster as well as other electronic displays for displaying vehicular information to a passenger of the vehicle.

SUMMARY

In accordance with one embodiment, a vehicle comprises an electronic display and a controller. The electronic display comprises a graphical lap information display portion comprising a lap time differential indicator and an illuminated portion. The lap time differential indicator is configured to display a differential time value and the illuminated portion is configured to selectively illuminate a portion of the graphical lap information display portion in a plurality of different lighting modes. The controller is configured to collect lap data and calculate a differential time value for display on the lap time differential indicator. The illuminated portion is operable in the plurality of different lighting modes in response to a rate of change of the differential time value.

In accordance with another embodiment, an electronic display comprises a graphical lap information display portion. The graphical lap information display portion comprises a lap time differential indicator, an illuminated portion, and a controller. The lap time differential indicator is configured to display a differential time value. The illuminated portion is configured to selectively illuminate a portion of the graphical lap information display portion in a plurality of different lighting modes. The controller is configured to collect lap data and calculate the differential time value. The illuminated portion is operable in the plurality of different lighting modes in response to a rate of change of the differential time value.

In accordance with yet another embodiment, a method of operating a graphical lap information display portion of an electronic display for displaying vehicular performance data is provided. The method comprises calculating a differential time value based at least in part upon archived lap data and displaying the differential time value on the graphical lap information display portion. The method further comprises selectively illuminating a portion of the graphical lap information display portion in different lighting modes in response to a change in the differential time value.

BRIEF DESCRIPTION OF THE DRAWINGS

It is believed that certain embodiments will be better understood from the following description taken in conjunction with the accompanying drawings in which.

DETAILED DESCRIPTION

Figure 1:
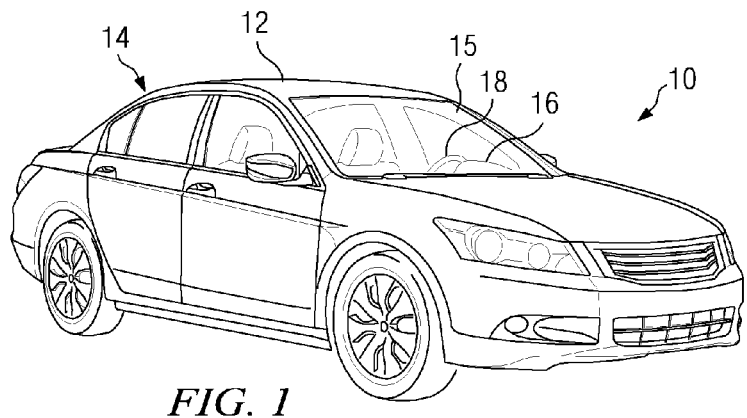
FIG. 1 is a perspective view of a vehicle which incorporates an electronic display according to one embodiment.

Certain embodiments are hereinafter described in detail in connection with the views and examples of FIGS. 1-5. An electronic display as described herein can be provided upon any of a variety of suitable vehicles such as, for example, cars, trucks, vans, watercraft, utility vehicles, recreational vehicles, and aircraft. An electronic display can be generally configured for use by a passenger of the vehicle to receive information about one or more systems present upon the vehicle, as described in further detail below. For example, a vehicle 10 is shown in FIG. 1 to include a body structure 12. The body structure 12 can include body members and frame members which generally define an outer shell of the vehicle 10, and which can at least partially define a passenger compartment 14 of the vehicle 10. Passengers (e.g., a driver or operator of vehicle 10) and cargo can reside within the passenger compartment 14 during use of the vehicle 10. A windshield 15 can be provided at a front of the passenger compartment 14.

Figure 2:
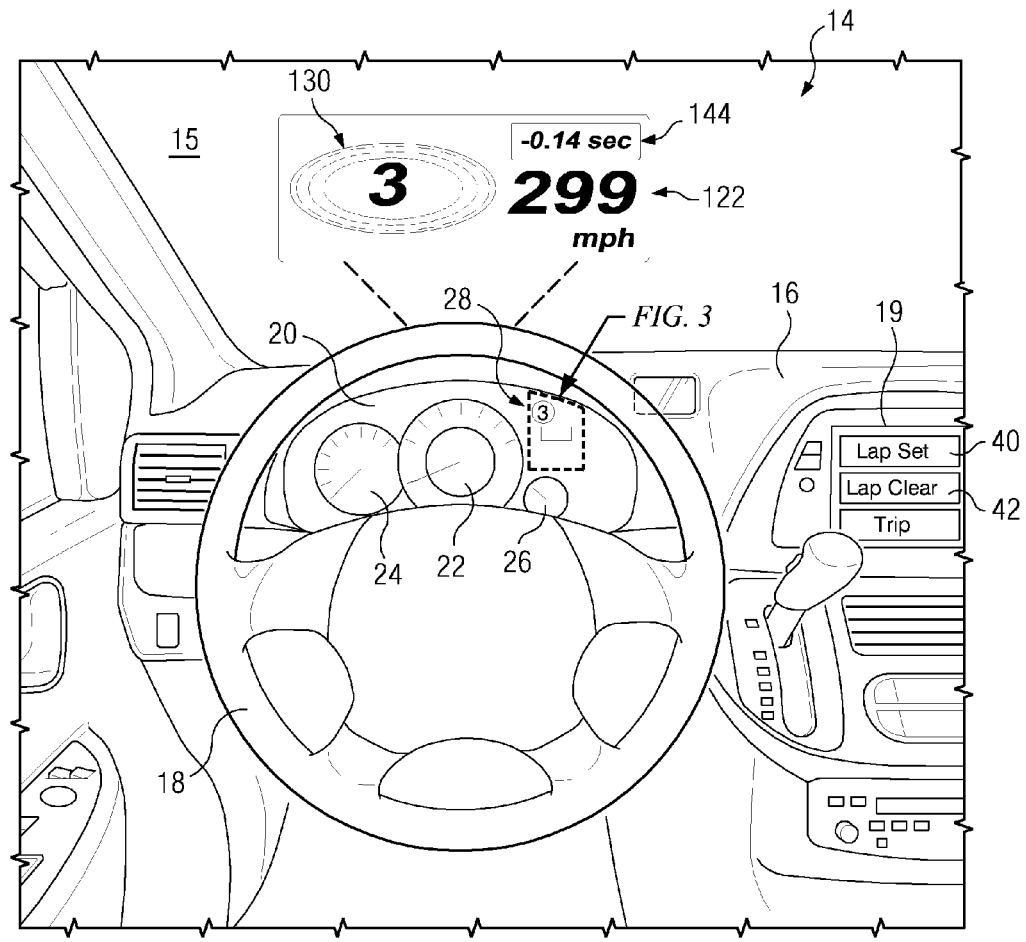
FIG. 2 is an interior view depicting an electronic instrument cluster and a heads-up display along with other features within a passenger compartment of the vehicle of FIG. 1.
Figure 3:
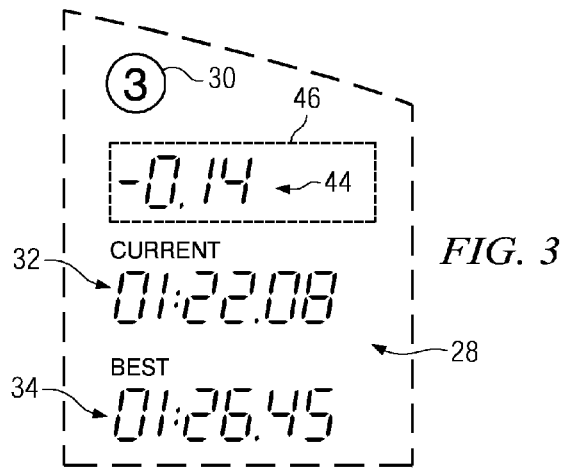
FIG. 3 is an enlarged view depicting a graphical lap information display portion of the electronic instrument cluster of FIG. 2.

A passenger seated within the passenger compartment 14 can facilitate steering of the vehicle 10 through use of a steering wheel 18 or other steering interface, such as shown in FIG. 2-3. It will be appreciated that a dashboard 16 can support indicators and control devices for use by a passenger to facilitate control of the vehicle 10. For example, an infotainment system 19 is shown in FIG. 2 to be attached to the dashboard 16. The infotainment system 19 can be used by a passenger to facilitate control of one or more systems present upon the vehicle 10 such as, for example, a radio, a climate control system, a trip computer, seat and mirror position controls, a navigation system (e.g., a global positioning system ("GPS")), a telephone, and vehicle diagnostics. The steering wheel 18 can extend from the dashboard 16, as generally shown in FIGS. 1-2.

The vehicle 10 can include an electronic display that is configured to provide vehicular information to a passenger of the vehicle 10. In one embodiment, the vehicle 10 can include an electronic instrument cluster 20 housed within the dashboard 16 and provided behind the steering wheel 18. The electronic instrument cluster 20 can include a speedometer portion 22, a tachometer portion 24, and a fuel gauge portion 26 for displaying information about the vehicle's speed, engine speed, and on-board fuel amount, respectively.

The electronic instrument cluster 20 can also include a graphical lap information display portion 28 that is configured to display graphical lap data to a passenger. The graphical lap information display portion 28 can include a lap indicator 30, a current lap timer 32, and a best lap time indicator 34, as illustrated in FIG. 3. When the vehicle 10 is repeatedly and successively driven along a predefined route, such as a race track, for example, the lap indicator 30 can indicate the current lap of the vehicle 10, the current lap timer 32 can display the elapsed time for the vehicle's current lap (e.g., a current lap time), and the best lap time indicator 34 can display the best time that the vehicle 10 has achieved for a lap along the predefined route. Each time that the vehicle 10 completes a lap, the lap value displayed on the lap indicator 30 can be incremented and the current lap timer 32 can be reset to facilitate timing of the new lap. The time of the completed lap (e.g., the completed lap time) can be compared against the best lap time displayed on the best lap time indicator 34. If the completed lap time is better than the best lap time, the best lap time indicator 34 can be updated with the completed lap time. If the completed lap time is worse than the best lap time, the existing best lap time can remain displayed on the best lap time indicator 34.

Figure 4:
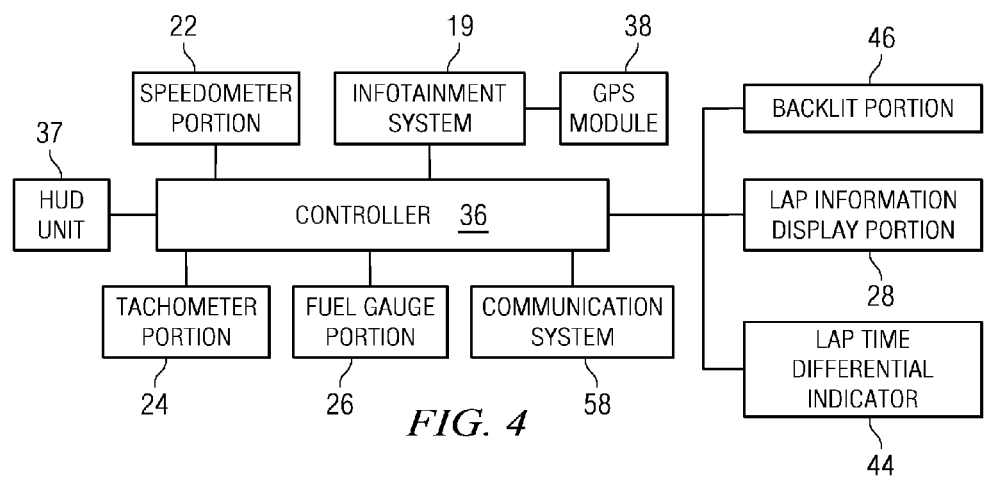
FIG. 4 is a block diagram depicting various components of the vehicle.

Referring now to FIG. 4, the vehicle 10 can include a controller 36. The controller 36 can be coupled with the infotainment system 19, the speedometer portion 22, the tachometer portion 24, the fuel gauge portion 26, and the graphical lap information display portion 28. The controller 36 can be configured to collect data from the vehicle 10 (e.g., via a CAN bus) and facilitate the real-time display of speed data upon the speedometer portion 22, engine speed data upon the tachometer portion 24, onboard fuel data upon the fuel gauge portion 26, and lap data upon the graphical lap information display portion 28. The controller 36 can also be coupled with a heads-up display (HUD) unit 37 that is configured to project a speedometer indicator 122 and a lap indicator 130 onto the windshield 15, as shown in FIG. 2. It will be appreciated that the HUD unit 37 can be configured to display any of a variety of additional or alternative suitable vehicular data on the windshield 15.

As illustrated in FIG. 4, the infotainment system 19 can be coupled with a GPS module 38 that is configured to identify, in real-time, a current location of the vehicle 10 for use in displaying real-time mapping information to a passenger. The controller 36 can also utilize the GPS data to facilitate timing of the vehicle's laps and mapping of the vehicle's current position during lap travel. For example, when the vehicle 10 begins its first lap, the controller 36 can identify the starting position of the vehicle 10 from the GPS data and can initiate the current lap timer 32. Each time the vehicle 10 completes a lap, the controller 36 can increment the lap value displayed on the lap indicator 30, can update the best lap time indicator 34, if appropriate, and can restart the current lap timer 32, as described above.

In one embodiment, the starting position of the vehicle 10 along a predefined route can be registered in the controller 36 by pressing a LAP SET button 40 displayed on the infotainment system 19, as illustrated in FIG. 2. In such an embodiment, the vehicle 10 can be provided at the starting position prior to driving the predefined route. The passenger can press the LAP SET button 40 which can facilitate registering of the current GPS coordinates of the vehicle 10 with the controller 36 as the vehicle's starting position. Each time the vehicle 10 drives across the starting position, the controller 36 can recognize that a lap has been completed. In another embodiment, the GPS coordinates of the starting position can be manually entered into the controller 36 via a keyboard (not shown) displayed on the infotainment system 19. In yet another embodiment, the GPS coordinates of the starting position can be uploaded to the controller 36 (e.g., through a wired or wireless data link) as part of an upload of predefined race track coordinates.

The infotainment system 19 is also shown to display a LAP CLEAR button 42 which, when pressed, can facilitate resetting of the best lap time displayed on the best lap time indicator 34. It will be appreciated that a LAP SET button and a LAP CLEAR button can be any of a variety of physical or virtual buttons and can be provided at a variety of other suitable locations upon the vehicle 10.

As illustrated in FIGS. 3 and 4, the graphical lap information display portion 28 can also include a lap-time differential indicator 44 that is configured to display a differential time value. The differential time value can indicate, in real-time, the difference between the current lap time and a best lap time value for a comparable position of the vehicle 10 along the lap or other predefined route (e.g., a delta time). As illustrated in FIG. 2, the HUD unit 37 can be configured to display a lap-time differential indicator 144 on the windshield 15. To calculate the differential time value, the controller 36 can collect/store a plurality of archived data points (e.g., the best lap time values) from the best lap time. Each archived data point can include GPS coordinates and a time stamp for multiple various locations of the vehicle 10 along the predefined route. Then, as the vehicle 10 travels again along the predefined route, the controller 36 can compare the current time and location of the vehicle 10 to the archived data point for a similar location on the predefined route. The difference between the time stamp of the archived data point and the current time of the vehicle 10 is then displayed as the differential time value. The differential time value can therefore indicate to a passenger the performance of the vehicle 10 relative to the previous lap time. For example, a negative differential time value can indicate that the vehicle 10 is currently faster than the best lap time, while a positive differential time value can indicate that the vehicle 10 is currently slower than the best lap time.

In one embodiment, the archived data points can be collected in real-time by the controller 36 during operation of the vehicle 10. In another embodiment, the archived data points can be provided to the controller 36 as part of a predetermined model, such as a model of the ideal route for a race track. In some embodiments, some of the archived data points can be extrapolated from real-time data points collected during lap travel.

The graphical lap information display portion 28 can include an illuminated portion 46 that is configured to backlight at least one of the values displayed on the graphical lap information display portion 28. The illuminated portion 46 can be operable in a plurality of different lighting modes in response to a rate of change of the differential time value (e.g., a slope of a line tangent to a plot of the differential time value over time). The lap-time differential indicator 44 and the illuminated portion 46 can be contained within the graphical lap information display portion 28. In one embodiment, the illuminated portion 46 can be configured to selectively backlight the differential time value with different colors in response to a change in the differential time value. When the differential time value is decreasing, the illuminated portion 46 can backlight the differential time value with a first color (e.g., green). When the differential time value is increasing, the illuminated portion 46 can backlight the differential time value with a second color (e.g., red). When the differential time value remains about the same (e.g., neither increasing nor decreasing), the illuminated portion 46 can backlight the differential time value with a third color (e.g., light blue). A passenger can therefore quickly assess his/her performance relative to the best lap time by quickly observing the color of the illuminated portion 46 without resulting in any significant distraction to the passenger such as, for example, by viewing a differential time value for prolonged periods to observe a change in value. It will be appreciated that, in some embodiments, an illuminated portion can be configured to selectively backlight a variety of other graphical display areas on an electronic display. In another embodiment, the lap-time differential indicator and the illuminated portion can be combined such that the displayed differential time value itself changes color in response to the rate of change of the differential time value. In yet another embodiment, one of the first, second, or third colors of the illuminated portion 46 can be substantially the same color as an adjacent portion of the electronic instrument cluster 20 such that the illuminated portion 46 substantially blends in with the surrounding portion of the electronic instrument cluster 20 (e.g., appears to be non-illuminated). In still other embodiments, an illuminated portion might not be a backlight feature, but instead provided as a standalone indicator disposed adjacent to or remotely from the lap time differential indicator 44 and/or the graphical lap information display portion 28.

It will be appreciated that a portion of an electronic display that is described herein as being graphical, such as graphical lap information display portion 28, should be understood to mean that the display is capable of displaying graphical information such as text (e.g., numeric, alphanumeric, and/or symbolic), X-Y plots, and/or real-time analog dials (e.g., a needle-type speedometer), for example, rather than simply being capable of providing a binary on/off display or status of a variable such as through selective illumination of a single LED. In some embodiments, the graphical portion of the electronic display can comprise a liquid crystal display, an OLED display, or any of a variety of other suitable alternative screens that are capable of displaying graphical information.

Figure 5:
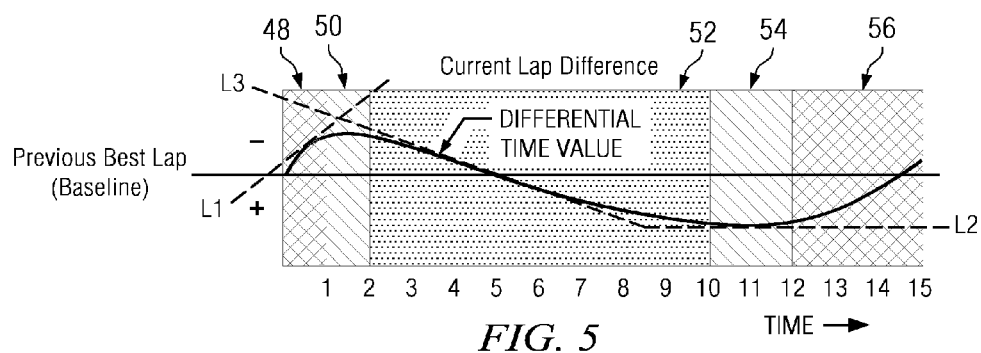
FIG. 5 is a plot depicting a differential time value varying over time and a response of an illuminated portion of the graphical lap information display portion of FIG. 3.

One example of the operation of the lap-time differential indicator 44 and the illuminated portion 46 is illustrated in FIG. 5 as a plot that depicts the differential time value changing over time and the response of the color of the illuminated portion 46 as it relates to the differential time value. In the example of FIG. 5, the differential time value is shown to be a negative value from the start of the lap to about 5 seconds, thus indicating that the vehicle 10 is performing faster than the best lap time, and then transitioning to a positive value from about 5 seconds to about 14 seconds, thus indicating that the vehicle 10 is performing slower than the best lap time. The rate of change of the differential time value can be identified by determining the slope of the plot of FIG. 5. For example, a tangent line L1 is shown in FIG. 5 to illustrate a slope of a portion of the plot during a first time segment 48. Tangent line L1 indicates that the differential time value is increasing during the first time segment 48, resulting from the vehicle's current lap time being in process of improving relative to the best lap time during the first time period 48. As another example, tangent line L2 indicates that the differential time value stays approximately the same during a fourth time segment 54, resulting from the vehicle's current lap time not substantially improving or substantially worsening relative to the best lap time during the fourth time period 48. As yet another example, tangent line L3 indicates that the differential time value is decreasing during a third time segment 52, resulting from the vehicle's current lap time being in process of worsening relative to the best lap time during the third time period 52.

The illuminated portion 46 can be illuminated with a first color (e.g., green) during the first and fifth time segments 48 and 56, to indicate to a passenger that the vehicle's current lap time is improving relative to the best lap time. The illuminated portion 46 can be illuminated with a second color (e.g., light blue) during the second and fourth time segments 50 and 54, to indicate to a passenger that the vehicle's current lap time is not substantially improving or substantially worsening relative to the best lap time. The illuminated portion 46 can be illuminated with a third color (e.g., red) during the third time segment 52, to indicate to a passenger that the vehicle's current lap time is worsening relative to the best lap time.

It will be appreciated that the illuminated portion 46 can be configured to display any of a variety of suitable alternative colors and/or to operate in any of a variety of different backlight modes. For example, the illuminated portion 46 can additionally or alternatively be configured to flash at different rates depending upon the rate of change of the differential time value. In another example, the size of the illuminated area of the illuminated portion 46 can vary as a function of the rate of change of the differential time value. In yet another example, the illuminated portion 46 can display an alphanumeric "+", "−", or zero in response to the rate of change of the differential time value.

Referring again to FIG. 4, the vehicle 10 can include a communication system 58 that is in communication with the controller 36. The communication system 58 can facilitate offloading of lap data from the vehicle 10. In one embodiment, the communication system 58 can include a wireless vehicle-to-vehicle communication-based system (e.g., V2V system). The V2V system can transmit/receive certain vehicular data, such as the vehicle's GPS location, driving direction, lap data, and other dynamic information to/from nearby vehicles equipped with similar V2V systems. The vehicular data from the other vehicles can be manipulated and displayed on the electronic instrument cluster 20 or other electronic display (i.e., infotainment system 19) to aid in assessing the performance of the other vehicles, such as during competition, for example. In one embodiment, the lap data from the other vehicles, such as the best lap time, can be compared to the current lap data of the vehicle 10. In such an embodiment, the illuminated portion 46 can be additionally or alternatively configured to selectively illuminate with different colors in response to the change in the differential time value as compared with the other vehicle's best lap time(s).

It will be appreciated that the communication system 58 can be configured to facilitate transmission of lap information, such as through wireless or wired communication, to any of a variety of remote data centers. For example, the communication system 58 can be configured to transmit lap data from the controller 36 to a crowd sourced website or other crowd sourced electronic database to facilitate comparison of the lap data to other lap data (e.g., from other drivers) for the same predefined route. In another example, the communication system 58 can be configured to transmit lap data to a real-time data center such as a display board at a racetrack or other tracking software for display to spectators.

It will be appreciated that although the electronic instrument cluster 20 is shown to be supported within the dashboard 16, other electronic displays for displaying lap data to a passenger are contemplated. For example, in some embodiments, a portable lap data unit can be provided having an electronic display and a controller and can display lap data to a passenger, similar to, or the same, as the electronic instrument cluster 20. In such an embodiment, the portable lap data unit can be selectively installed into a vehicle as an aftermarket unit and can be coupled with the vehicle's data system through wireless or wired communication, such as, for example, by connecting a communication cable to the vehicle's on-board diagnostic (OBD) port.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art.

Rather it is hereby intended the scope of the invention be defined by the claims appended hereto.

What is claimed is:

1. An electronic display comprising a graphical lap information display portion, the graphical lap information display portion comprising:
   a lap time differential indicator configured to display a differential time value;
   an illuminated portion configured to selectively illuminate a portion of the graphical lap information display portion in a plurality of different lighting modes; and
   a controller configured to collect lap data and calculate the differential time value; wherein:
   the illuminated portion is operable in the plurality of different lighting modes in response to a rate of change of the differential time value;
   the illuminated portion is configured to backlight the differential time value; and
   operation in each of the plurality of different lighting modes comprises displaying a first color, a second color, and a third color.

2. The electronic display of claim 1 wherein the illuminated portion is configured to display the first color, the second color, and the third color, when the differential time value increases, decreases, and does not substantially change, respectively.

3. A vehicle comprising the electronic display of claim 1.

4. An electronic display comprising:
   a lap time differential indicator configured to display a differential time value;
   an illuminated portion configured to selectively illuminate a portion of the graphical lap information display portion in a plurality of different lighting modes;
   a controller configured to collect lap data and calculate the differential time value; and
   a GPS module coupled with the controller and configured to identify a current location of a vehicle; wherein:
   the illuminated portion is operable in the plurality of different lighting modes in response to a rate of change of the differential time value;
   the electronic display further comprises:
      a current lap time indicator configured to display a current lap time; and
      a best lap time indicator configured to display a best lap time; and
   the controller is further configured to:
      store a plurality of best lap time values for the vehicle along a predefined route; and
      calculate the differential time value by comparing the current lap time to at least one of the best lap time values corresponding with the current location of the vehicle.

5. A vehicle comprising the electronic display of claim 4.

6. An electronic display comprising:
   a lap time differential indicator configured to display a differential time value;
   an illuminated portion configured to selectively illuminate a portion of the graphical lap information display portion in a plurality of different lighting modes;
   a controller configured to collect lap data and calculate the differential time value; and
   a communication system coupled with the controller and configured to facilitate transmission of lap data from the controller to a remote data center;
   wherein the illuminated portion is operable in the plurality of different lighting modes in response to a rate of change of the differential time value.

7. A vehicle comprising the electronic display of claim 6.

8. A method of operating a graphical lap information display portion of an electronic display for displaying vehicular performance data, the method comprising:
   calculating a differential time value based at least in part upon archived lap data;
   displaying the differential time value on the graphical lap information display portion; and
   selectively illuminating a portion of the graphical lap information display portion in different lighting modes in response to a change in the differential time value;
   wherein:
   selectively illuminating the portion of the graphical lap information display portion comprises selectively backlighting the differential time value; and
   selectively illuminating the portion of the graphical lap information display portion comprises displaying a first color, a second color, and a third color.

9. The method of claim 8 wherein displaying the first color, the second color, and the third color comprises:
   displaying the first color while the differential time value is increasing;
   displaying the second color while the differential time value is decreasing; and
   displaying the third color while the differential time value is not substantially changing.

10. A method of operating a graphical lap information display portion of an electronic display for displaying vehicular performance data, the method comprising:
    calculating a differential time value based at least in part upon archived lap data;
    displaying the differential time value on the graphical lap information display portion; and
    selectively illuminating a portion of the graphical lap information display portion in different lighting modes in response to a change in the differential time value;
    wherein selectively illuminating a portion of the graphical lap information display portion comprises changing a color of the displayed differential time value in response to the rate of change of the differential time value.

11. A method of operating a graphical lap information display portion of an electronic display for displaying vehicular performance data, the method comprising:
    calculating a differential time value based at least in part upon archived lap data;
    displaying the differential time value on the graphical lap information display portion;
    selectively illuminating a portion of the graphical lap information display portion in different lighting modes in response to a change in the differential time value;
    determining a current lap time;
    determining a best lap time;
    storing a plurality of best lap time values for the vehicle along a predefined route; and
    calculating the differential time value by comparing the current lap time to at least one of the best lap time values corresponding with a current location of the vehicle.

* * * * *